June 2, 1925. 1,539,829
F. L. COLE
GUARD AND WORK REST MOUNTING
Filed April 10, 1922

Inventor:
Frank L. Cole,
By Fisher, Fowle, Clapp & Soans
Attys.

Patented June 2, 1925.

1,539,829

UNITED STATES PATENT OFFICE.

FRANK L. COLE, OF CHICAGO HEIGHTS, ILLINOIS, ASSIGNOR TO CANEDY-OTTO MFG. CO., OF CHICAGO, ILLINOIS, A CORPORATION OF ILLINOIS.

GUARD AND WORK-REST MOUNTING.

Application filed April 10, 1922. Serial No. 551,038.

*To all whom it may concern:*

Be it known that I, FRANK L. COLE, a citizen of the United States, residing at Chicago Heights, in the county of Cook and State of Illinois, have invented certain new and useful Improvements in Guards and Work-Rest Mountings, of which the following is a specification.

My invention relates to grinders and similar machines, and has reference particularly to the instrumentalities whereby a guard for the grinder wheel or operating element of similar machines, and also a rest or support for the work to be operated upon, are mounted on the frame of the machine.

It is usually desirable in grinders and similar machines to provide a guard for the operating element to protect the operator, and as purchasers frequently do not decide to use a guard until they have had the machine for a while, it is important that the machine should be equipped so that the guard may be mounted thereon without difficulty by the purchaser. It is also important, from a manufacturing standpoint, to simplify the attachment of the guard so as to lessen the cost of manufacturing and assembling, and, moreover, it is desirable to provide a mounting which does not add unnecessary expense to machines which are furnished without a guard, or give such machines an incomplete appearance. It is also desirable to mount the guard so that it may be adjusted, as the wheel or other operating element wears, to keep the guard close to the operating face of the wheel, so that it will not interfere with the placing of the work in the operating position, and will permit the operator to have a clear and unobstructed view of the work that is being done by the machine. These objects are accomplished in my invention by forming a tubular extension on the frame of the machine around the rear end of the opening in which the rest or support for the work is mounted, thereby not only affording a convenient means for clamping a guard on the machine so that it can be adjusted to properly expose the working face of the grinder wheel or other operating element, but also forming a longer and more substantial bearing for the work rest or support than in machines of this character heretofore constructed. I prefer to form this mounting for the guard by casting a steel or other suitable tube in the frame, as by doing so I not only provide a guard supporting tubular extension which does not require turning down or machining, but I also, as the same time, provide a smooth bore opening for the work rest or support which does not require boring out or machining.

Figure 2:
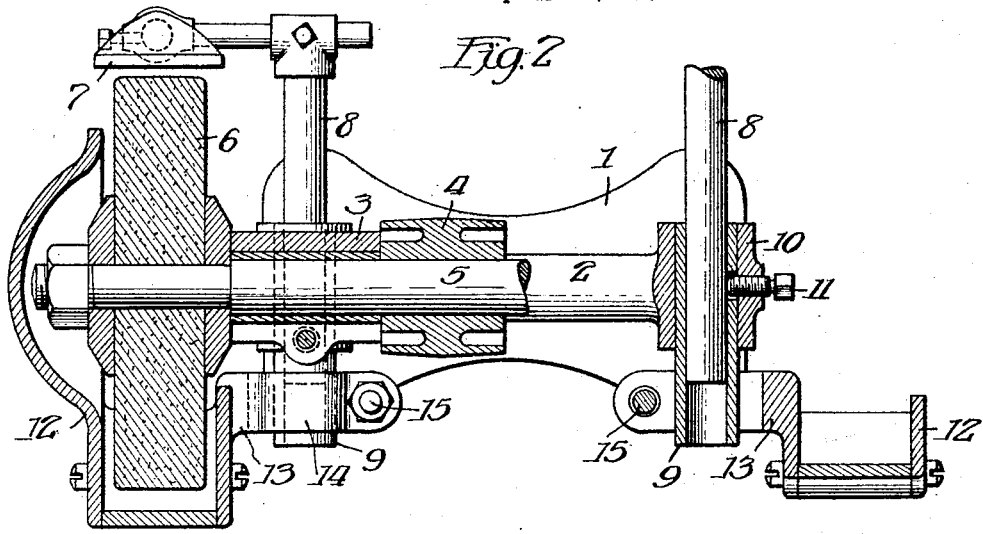
Figure 1:
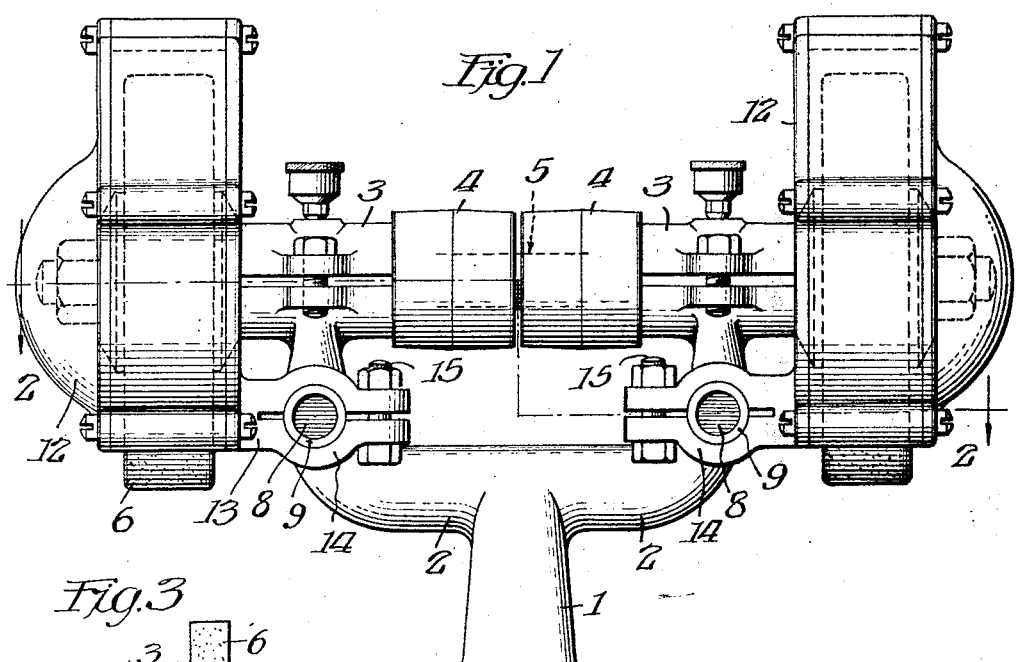

On the drawings:

Fig. 1 is a rear view of a grinder embodying my improvements;

Fig. 2 a sectional view on the line 2—2 of Fig. 1; and

Figure 3:
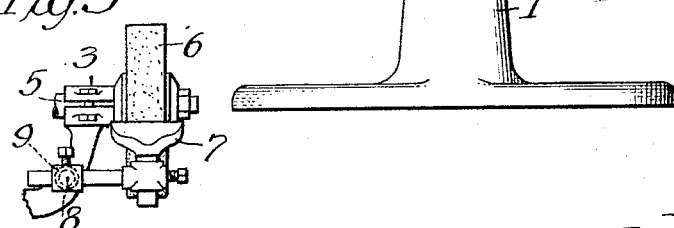

Fig. 3 a fragmentary front view of the grinder showing the rest or support for the work.

Referring to the drawings, the reference numeral 1 indicates the supporting standard of the machine, which may be of any suitable type for bench or floor mounting, and has a yoke portion 2 at the upper end supporting spaced bearings 3 with pulleys 4 therebetween on the shaft 5 which is journaled to rotate in the bearings 3. The shaft 5 is constructed at the outer side of one or both of the bearings 3 to have grinder wheels 6 or other operating elements mounted thereon, for performing the particular work which is required of the machine.

It is customary to provide machines of this character with rests 7 to support the work in position to be operated upon by the wheel 6, said rests being of various forms as desired and adjustably supported so that they may be located in different positions of adjustment. In my construction, I mount the rest 7 on a shaft 8 which is adjustably secured in an opening extending through the adjacent arm of the yoke 2 from front to rear of the machine, said opening being preferably provided by casting a steel tube 9 in each arm of the yoke 2 in a manner well-known to foundrymen. By using a steel tube and casting it in the frame of the machine, I not only secure the tube permanently in place in the frame, but also provide a smooth opening for the shaft of the work rest and avoid the necessity of boring out this opening in the frame. The frame of the machine is formed with a hub portion 10 around the tube 9, and this hub portion as well as the tube, is drilled at the outer side to provide an aperture which is tapped to take a set screw 11 for clamping the shaft 8 of the rest in the opening of the tube, and the tube projects at the rear of the machine beyond the hub 10 as shown in Fig. 2, so as to form a long bearing for the shaft 8, and also afford a mounting for a guard for the adjoining wheel 6. The guard, which is shown at 12, may be of any desired construction, and has an arm 13 extending laterally therefrom, and formed with a split clamp 14 which is adapted to be secured by the clamping bolt 15 on the rear projecting portion of the tube 9. With this construction the guard may be adjusted axially along the rear projecting portion of the tube 9 and by reason of this adjustment the front edge of the guard may be positioned close to the working face of the wheel so that it will not interfere with the placing of the work in the operating position and will not obstruct the operator's view of the work.

While I have shown and described my invention in a preferred form, I am aware that various changes and modifications may be made without departing from the principles of my invention, the scope of which is to be determined by the appended claims.

I claim as my invention:

1. In a machine of the class described, the combination of a frame having an operating element mounted thereon, and means arranged co-axially on the frame and supporting respectively a guard for the operating element and a rest for holding articles in position to be operated upon by said element.

2. In a machine of the class described, the combination of a frame having an operating element mounted thereon, means on the frame having external and internal supporting portions, a guard for the operating element mounted on one of said portions, and a rest mounted on the other portion for holding articles in position to be operated upon by said operating element.

3. In a machine of the class described, the combination of a frame having an operating element mounted thereon, a projection at one side of the frame having an opening leading thereunto from the other side of the frame, a guard for the operating element mounted on the projection, and a rest mounted in the opening for holding articles in position to be operated upon by said operating element.

4. In a grinder, the combination of a frame having a grinder wheel journaled thereon, said frame being provided with an aperture and a tubular extension at one end of the aperture, a guard for the grinder wheel mounted on the tubular extension, and a rest mounted in the aperture for holding articles in position to be operated upon by said grinder wheel.

5. In a grinder, the combination of a frame, a grinder wheel journaled thereon, a cylindrical extension at one side of the frame having an opening therein extending through the frame, and a work rest and a grinder wheel guard mounted for independent adjustment at opposite sides of the frame, in the opening and on the cylindrical extension respectively.

6. In a grinder, the combination of a standard having a yoke shaped portion at the top with an aperture extending through one of the arms of the yoke, a bearing in each arm of the yoke shaped portion, a shaft journaled in said bearings and having a grinder wheel mounted thereon, a rest adjustably secured in the aforesaid aperture for holding articles in position to be operated upon by said grinder wheel, a tubular extension on said arm, at the rear end of the aforesaid opening, and a grinder wheel guard clamped on said tubular extension.

7. In a grinder, the combination of a frame having an operating element journaled thereon, a tube having one end secured in the frame, a guard for the operating element supported on the other end of the tube, and a work rest having a supporting stem extending into the tube, and means for clamping said stem in the tube.

FRANK L. COLE.